(No Model.)
H. C. & J. A. HENDERSON.
APPARATUS FOR CONCENTRATING ORES.
No. 325,835. Patented Sept. 8, 1885.
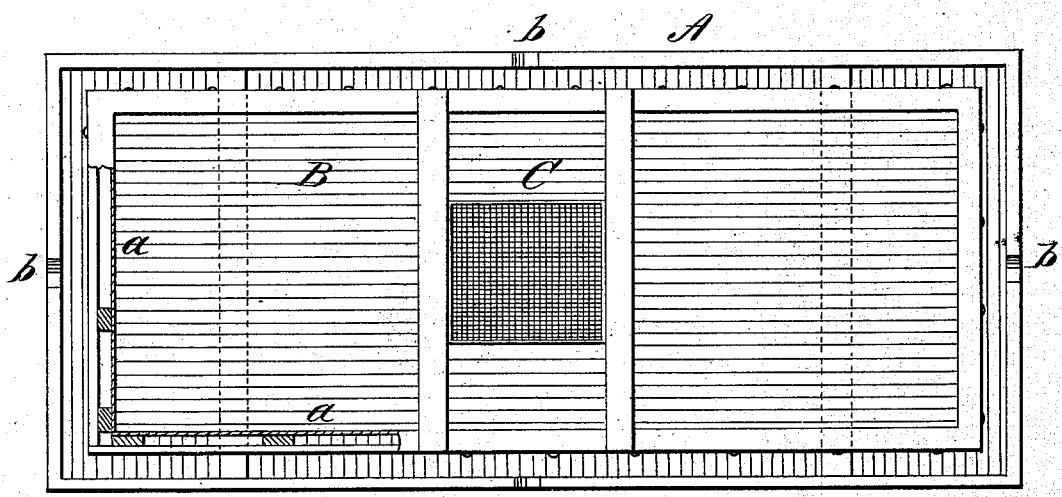
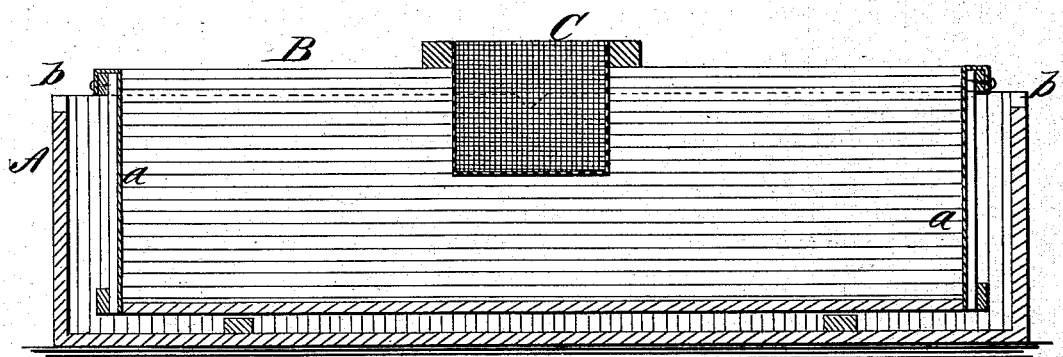
WITNESSES:
INVENTOR:
H. C. Henderson
J. A. Henderson
BY Munn & Co.
ATTORNEYS.

UNITED STATES PATENT OFFICE.

HOWARD C. HENDERSON AND JAMES A. HENDERSON, OF CHEROKEE, IOWA.

APPARATUS FOR CONCENTRATING ORES.

SPECIFICATION forming part of Letters Patent No. 325,835, dated September 8, 1885.

Application filed October 4, 1884. (No model.)

*To all whom it may concern:*

Be it known that we, HOWARD C. HENDERSON and JAMES A. HENDERSON, both of Cherokee, in the county of Cherokee and State of Iowa, have invented a new and Improved Apparatus for Concentrating Ores, of which the following is a full, clear, and exact description.

The object of our invention is to save and concentrate the light and fine particles of ore—such as sulphurets and chlorides of silver and gold—carried away with the waste water in mining operations.

The invention consists in the construction and arrangement of parts, as will be hereinafter fully described and claimed.

Reference is to be had to the accompanying drawings, forming part of this specification, in which similar letters of reference indicate corresponding parts in both the figures.

Figure 1 is a plan view, partly sectional, of the apparatus, and Fig. 2 is a vertical section of the same.

A is a tight box or tank of suitable size, containing a filter-tank, B, which is of somewhat smaller size, so that there is space at the sides and bottom between the two tanks.

At the middle of tank B a small box, C, made of perforated metal, is suspended from cross-bars, so as to be within the filter-tank, but with its edges projecting slightly above the tank.

The sides of the filter-tank B are formed by blankets *a*, or other cloth filtering material, which will prevent the minerals from passing with the water into tank A. At *b*, in the upper edges of tank A, are notches for directing the overflow of water, and there may be in addition holes in the sides of tank A, near the bottom, for escape of the water, either during the operation or when the tanks are to be emptied.

The operation is as follows: The water containing the ores is led to the perforated feed-box C by a trough or pipe extending to near the bottom of the box, so that the delivery is below the surface of the water standing in the tanks, thereby avoiding agitation and "drowning" the ore. The water passes freely out through the sides and bottom of the feed-box without producing a current in any direction, whereby the ore is left free to settle on the bottom of the filter-tank B, or is caught by the blankets and will then precipitate, as there is not current enough to carry the particles into the interstices of the blankets. The outside tank, while retaining the large body of water nearly stagnant, allows overflow at its upper edges.

By this apparatus when the tanks are properly proportioned to the supply of water the water is retained nearly stagnant, so that there is no current strong enough to interfere with the filtration and precipitation of the ore particles. Where there is a current the operation is liable to become stopped by the current carrying the particles into the blankets; but in this case there is no current, the water merely filtering slowly through the blankets *a*.

Having thus described our invention, what we claim as new, and desire to secure by Letters Patent, is—

The apparatus herein described for concentrating ores, the same consisting of an outer tank, A, an inner filtering-tank, B, provided with fabric ends, and the perforated feed-box C, having its lower end below the top edge of the tank B, a space being left between the sides, ends, and bottom of the tanks B A, whereby, when the water is received by the perforated feed-box, it will pass into the tank B and slowly filter through the fabric ends thereof and flow over the top edge of the tank A, the fabric ends preventing the formation of a current and causing the particles of ore to be precipitated, substantially as set forth.

HOWARD C. HENDERSON.
JAMES A. HENDERSON.

Witnesses:
G. A. WELLMAN,
C. M. CANNON.